(12) United States Patent
Kitade et al.

(10) Patent No.: US 7,633,188 B2
(45) Date of Patent: Dec. 15, 2009

(54) SLIDING DEVICE WITH ONBOARD MOVING-MAGNET LINEAR MOTOR

(75) Inventors: Norimitsu Kitade, Kanagawa-ken (JP); Masaki Ohno, Kanagawa-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 303 days.

(21) Appl. No.: 11/743,474

(22) Filed: May 2, 2007

(65) Prior Publication Data

US 2007/0257564 A1 Nov. 8, 2007

(30) Foreign Application Priority Data

May 2, 2006 (JP) ............... 2006-128174

(51) Int. Cl.
*H02K 41/00* (2006.01)

(52) U.S. Cl. .................. 310/12.23; 310/12.33

(58) Field of Classification Search ............. 310/12–14
See application file for complete search history.

(56) References Cited

U.S. PATENT DOCUMENTS

| | | | | |
|---|---|---|---|---|
| 5,825,104 A | * | 10/1998 | Kondo et al. | 310/12 |
| 6,326,708 B1 | * | 12/2001 | Tsuboi et al. | 310/12 |
| 6,348,746 B1 | * | 2/2002 | Fujisawa et al. | 310/12 |
| 6,573,623 B2 | * | 6/2003 | Tsuboi et al. | 310/12 |
| 7,170,204 B2 | * | 1/2007 | Kitade | 310/12 |

FOREIGN PATENT DOCUMENTS

| | | | |
|---|---|---|---|
| JP | 61001255 A | * | 1/1986 |
| JP | 2001-352744 | | 12/2001 |
| JP | 2001352744 A | * | 12/2001 |
| JP | 2002-010617 | | 1/2002 |
| JP | 2005-333702 | | 12/2005 |
| JP | 2006-060969 | | 3/2006 |

* cited by examiner

*Primary Examiner*—Tran N Nguyen
(74) *Attorney, Agent, or Firm*—Browdy & Neimark,PLLC (57) ABSTRACT

A sliding device with onboard moving-magnet linear motor is envisaged making the reciprocating stroke of a table longer, and enhancing the propulsion, high velocity and response of the table even with small in dimension, compact in construction and better in production efficiency. With the sliding device, a bed serves as a coil yoke while a table is as a magnet yoke. An armature assembly is composed of armature windings, a board on which the armature windings lie in juxtaposition, a wiring lying on the board and making connections with a power line to supply electric power to the armature windings, a protective sheet covering an overall surface of the armature windings and moldings of adhesive material to get the armature windings and connections of a power line with wiring closely adhering to the board.

3 Claims, 11 Drawing Sheets

FIG. 18

SLIDING DEVICE WITH ONBOARD MOVING-MAGNET LINEAR MOTOR

FIELD OF THE INVENTION

The present invention relates to a sliding device with onboard moving-magnet linear motor, which has been extensively used in fields as diverse as semiconductor industries, various assembling machines, precise measuring/inspection equipments, testing machines, machine tools, and so on.

BACKGROUND OF THE INVENTION

Modern sliding devices with onboard moving magnet linear motor are more shrinking in construction to find increased applications in diverse fields including semiconductor manufacturing equipments, various assembling machines, measuring instrument, and so on. The advanced sliding devices with onboard moving magnet linear motor are more needed to meet anticipated design specifications including compact and simple construction, high propulsion and accuracy in operation, high dust-proofing, durable and safety properties, ease in use and handling, maintenance-free working for lubrication of the linear motion guide units in which the sliding devices are incorporated, and less expensive production cost.

An example of the sliding devices with onboard moving-magnet linear motor is disclosed in, for example commonly assigned Japanese Patent Laid-Open No. 2005-333702. The prior sliding device is composed of an elongated flat bed, a flat table movable for reciprocation in a lengthwise direction by virtue of a linear motion guide unit, a field magnet of magnet segments lying on a first surface of the table confronting the bed in a way unlike magnetic poles are juxtaposed alternately in polarity in a traveling direction of the table, and an armature assembly having coreless armature windings of rectangular shape, which are installed on a second surface of the bed confronting the table in opposition to the field magnet in lengthwise direction. The bed and table are both made of magnetic material to establish magnetic circuits in part in a fashion the bed serves as a coil yoke while the table is as magnet yoke. On the surface of the table facing on to the bed, there is made a recess to set in place the field magnet of the magnet segments. Moreover, the recess is made to have a depth not more than a third a thickness of the field magnet. With the sliding device constructed as stated earlier, it is said that the table is constituted to make the stroke length larger, making the operating performance higher in traveling velocity and response, and further improving efficiency in production.

Another commonly assigned Japanese Patent Laid-Open No. 2002-10617 discloses the sliding device with onboard moving-magnet linear motor in which both the field magnet segments and armature windings are fewer in number than those in the sliding device recited earlier. The sliding device has the construction that makes it possible to rectify a magnetic flux pattern outside any one N-pole of forward and aft end poles of the field magnet, thereby sensing accurately a table position by a magnetic sensor element. Position of the table is monitored by the magnetic sensor element lying on the bed in opposition to the field magnet. Arranged outside the end pole of the field magnet is an auxiliary magnet unlike the associated end pole of the field magnet in polarity and less in range to have no effect on propulsion exerted on the moving table from the field magnet. The auxiliary magnet constructed as stated above serves to rectify the magnetic flux pattern at the end pole of the field magnet, which might otherwise deviate outwardly, thereby making sure of the same magnetic flux pattern as in the magnetic flux found at a boundary between any two adjacent magnetic poles in the field magnet. Thus, this auxiliary magnet makes it possible to sense any end pole of the field magnet with the same accuracy as at the boundary between the two adjacent poles in the field magnet.

A further another commonly assigned Japanese Patent Laid-Open No. 2001-352744 discloses the sliding device with built-in moving-magnet linear motor that is envisaged more accurate position control of the slider relatively to the bed as well as operating performance higher in traveling velocity and response ability. With this prior sliding device, the armature assembly is made to carry a three-phase conduction system while a driving circuit is transferred to the external driver to make the bed simple in construction, thereby resulting in reducing the sliding device in the overall height. A field magnet is made of rare earth permanent magnet to raise flux density, thereby ensuring the provision of high propulsion for the table. An encoder to monitor a position of the table is an optical encoder having an optical linear scale, which contributes to improvement in accurate monitoring. The construction in which the armature windings connected to cords, lines, and so on are placed on the stator side has less fear of causing dust and dirt, thus realizing clean environment.

The prior sliding device recited above proved successful in making the traveling stroke longer as well as in serving functions of high operating velocity and response, with parts including table, and so on which are designed to raise their manufacturing efficiency. Nevertheless, modern technology needs further advanced sliding devices that are more compact and simple in construction with high propulsion and accuracy in operation, high dust-proofing, durable and safety properties, ease in use and handling, maintenance-free working for lubrication of the linear motion guide units in which the sliding devices are incorporated, and less expensive production cost.

On the other side, a coreless armature and a linear motor using the same are disclosed in Japanese Patent Laid-Open No. 2006-60969 in which a base is made lengthwise thereof with dovetail groove while molding resin is charged in the dovetail groove to cause the resin to fill the dovetail groove, keeping the molded resin against falling away from the base to make certain of integral construction of the base with the armature windings embedded in the molded resin. The prior coreless armature and a linear motor using the same recited earlier, however, would entail a disadvantage of complicated manufacturing process to mold the armature windings integral with the base, which is previously cut with the dovetail groove.

In recent years, the sliding devices with onboard moving magnet linear motor are finding increased application in the industries where the moving object including the table and so on needs to travel across comparatively long stroke or interval. Thus, it remains a major challenge to upgrade the current sliding device to allow the table traveling over a long-range stroke or interval. To cope with this, it is needed to make the moving table as simpler as possible in construction and also as lighter as possible in weight to boost up the propulsion of the table and further get traveling velocity and response higher, even with small or compact in construction and better in production efficiency.

SUMMARY OF THE INVENTION

The present invention has as its primary object to overcome the subject stated earlier and, in particular, to provide a sliding device with onboard moving-magnet linear motor, in which a moving table is allowed operating over longer traveling distance or stroke, with serving better performances of high propulsion, high traveling velocity, high response, and so on. More in detail, the major object of the present invention is to provide a sliding device with onboard moving-magnet linear motor, in which various parts or components mounted on either of the bed and the table so far get turned over to any stationary control console to make the moving table itself less in weight, simpler in construction and better efficient in production efficiency.

The present invention relates to a sliding device with onboard moving-magnet linear motor, comprising an elongated bed of flat configuration, a table of flat configuration movable for reciprocation in a lengthwise direction by virtue of a linear motion guide unit, a field magnet of magnet segments lying on a first surface of the table opposite the bed in a way unlike magnetic poles are juxtaposed alternately in polarity in a traveling direction of the table, and an armature assembly having coreless flat armature windings, which are installed on a second surface of the bed opposite the table in opposition to the field magnet in lengthwise direction, wherein the bed and the table are both made of magnetic material to provide magnet yoke and coil yoke for establishing magnetic circuits in part, and wherein the armature assembly is composed of the armature windings, a board on which the armature windings lie in juxtaposition, a wiring lying on the board and making connections with a power line to supply electric power to the armature windings, and an adhesive material cast around the armature windings to get the armature windings closely adhering to the board whose a lower surface is fastened immediately to the second surface of the bed.

In one aspect of the present invention, a sliding device is provided in which the armature assembly includes a protective sheet covering an overall surface of the armature windings opposite the field magnet, and a first molding of adhesive material cast to secure the armature windings lying between the protective sheet and the board. As an alternative, the armature assembly further includes a second molding of adhesive material cast to secure connections of the power line with the wiring on the board.

In another aspect of the present invention, a sliding device is provided in which end plates are fastened to forward and aft ends of the bed in a way coming into contact with ends of the board of the armature assembly to keep the table against falling away from the bed. As an alternative, the end plates are each made of a plate member bent into an L-shape in section and made with a recess to fit over the power line.

In another aspect of the present invention, a sliding device is provided in which the board of the armature assembly has holes that are used to fasten the board to the bed with using a fastening screw. Moreover, the holes made in the board are arranged at forward and aft ends of the board, two for each end.

In another aspect of the present invention a sliding device is provided in which the table and/or the bend are made symmetrical in sliding direction of the table.

In a further another aspect of the present invention a sliding device is provided in which the table has threaded holes made to fasten another sliding device thereto in a perpendicularly staggered fashion with one another, the threaded holes being disposed in a way matching hole positions of the holes in the bed after a 90° rotation.

In another aspect of the present invention, a sliding device is provided in which there is provided a linear motion guide unit composed of a guide rail and a slider, and wherein the table has a locating pin to make certain of accurate location of the slider with respect to the table.

In another aspect of the present invention, a sliding device is provided in which there is provided a linear encoder made up of a linear scale and a sensor, the linear scale being attached on the first surface of the table in a way extending along any one side of the table in a sliding direction of the table, while the sensor being secured on a corresponding side of the bed in opposition to the linear scale, and wherein the linear scale is notched at fore and aft midway location referring to the origin mark.

The sliding device with onboard moving-magnet linear motor constructed as stated earlier hopes to make the sliding device itself with the minimum number of parts and components necessary to basic construction. To this end, with the sliding device of the present invention, various instruments such as limit sensors and so on conventionally installed on the sliding device, for example, are turned over to any stationary control console to make the sliding device simpler in construction and less in weight, thereby enhancing propulsion, working velocity and response ability in the reciprocation motion of the table. Thus, the sliding device of the present invention allows the table traveling for reciprocation over longer stroke compared with the prior sliding devices, even with small or compact in construction. The sliding device of the present invention is moreover convenient for manufacturing at high production efficiency and more versatile for a diversity of machines.

The above and other related aspects and features of the present invention will be more apparent to those skilled in the art from a reading of the following description of the disclosure found in the accompanying drawings and the novelty thereof pointed out in the appended claims.

BRIEF DESCRIPTION OF THE DRAWINGS

FIGS. 15($a$) and 15($b$) are views in plan to illustrate how the sliding device of FIG. 2 is designed in mind for ease of operation:

DETAILED DESCRIPTION OF THE PREFERRED EMBODIMENTS

The sliding device with an onboard moving-magnet linear motor according of the present invention is envisaged incorporating it in a diversity of machinery including semiconductor manufacturing equipments, various assembling machines, measuring/inspection instrument, testing equipments, machine tools, and so on, which are expected to operate in controlled atmosphere including clean room, testing/experimental laboratories, and so on.

Compared with the sliding device of the prior art disclosed in, for example, the commonly assigned Japanese Patent Laid-Open No. 2005-333702, the sliding device of the present invention is constructed to allow field magnets and armature windings larger in their dimensions to render the propulsion exerted on the table more powerful. With the sliding device according to the present invention, some instruments and components including limit sensors, before-origin sensors, origin marks, and so on are dislodged from the sliding device, instead, installed on any stationary control console to get the sliding device itself simpler or nimbler in construction. Moreover, the armature windings and circuits in the armature assembly are all concealed in moldings to achieve better tightness. The sliding device of the present invention may be easily customized by only reversed placement of the armature assembly over 180° in compliance with modification to design specifications in mind for ease of use on either side. According to the present invention, further, the parts including a bed, stopper, and so on are made as simple as possible in shape, which can be produced inexpensively. The sliding device may be made less in the overall length and more compact in construction. Moreover, the sliding device of the present invention can be made in a wide range of sizes, from very small systems to very large systems depending on design considerations to expand the scope of useful applications.

Preferred embodiments of a sliding device according to the present invention will be explained later in detail with reference to the accompanying drawings. The sliding device of the present invention is considered best suited for incorporating it in a diversity of machinery including semiconductor manufacturing equipments, various assembling machines, measuring/inspection instrument, testing equipments, position-control tables, sliding tables, and so on.

A sliding device 50 is shown in FIGS. 1 to 5 as being comprised of a field magnet 6 of four pole pieces or four segments of permanent magnet 25, and an armature assembly 5 of six armature windings 7 correspondingly to the permanent magnet segments 25. It will be, however, appreciated that the sliding device 50 may be comprised of the field magnet 6 of eight pole pieces and the armature assembly 5 of twelve armature windings 7 as in prior sliding devices. Compared with the conventional construction, the sliding device 50 of the present invention is more compact and simpler in construction with high propulsion and accuracy in operation, high dust-proofing, durable and safety properties, ease in use and handling, maintenance-free working for lubrication of the linear motion guide units in which the sliding device is incorporated, and less expensive production cost.

The sliding device 50 made small in construction is composed of a moving table 1 installed thereon with the field magnet 5 and made of magnetic material, such as steel, serving as a magnetic yoke to establish a magnetic circuit in part, and a stationary bed 2 made of magnetic material as with the table 1 serving as a coil yoke to establish a magnetic circuit in part for the armature windings 7. With the sliding device 50 constructed as stated earlier, especially, the moving table 1 and the stationary bed 2 are both made of magnetic material so as to serve as a magnet yoke and a coil yoke, respectively, to establish magnetic circuits. On a lower surface 52 of the table 1 opposite to the bed 2, there is made a fore-and-aft recess 33, which extends in a moving or sliding direction of the table 1 with a widthwise dimension to fit snugly over the field magnet 6. The table 1 is cut deep on a top surface thereof to make a relief recess 39 extending fore and aft in the sliding direction. The sliding device 50 of the present invention is envisaged getting both the field magnet 6 and armature winding 7 larger in dimension to power up the propulsion exerted on the table 1. To cope with this, the sliding device 50 sets out to remove any usual mechanical equipment, not shown, to control console 49, refer to FIG. 18, for making construction in itself much simpler.

Figure 4:
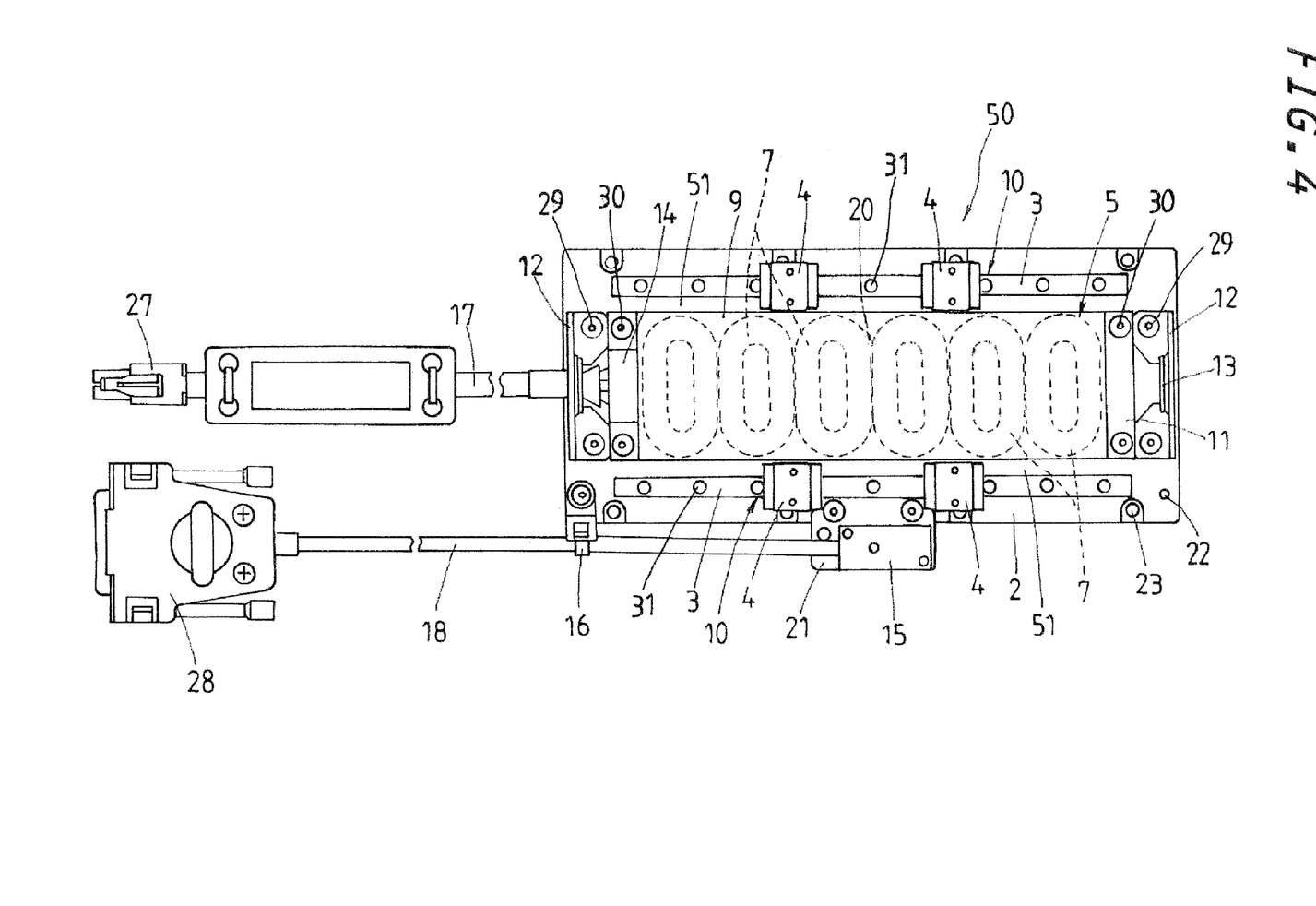
FIG. 4 is a top plan view similar to FIG. 2 to show the sliding device, but a moving table being shown removed.
Figure 5:
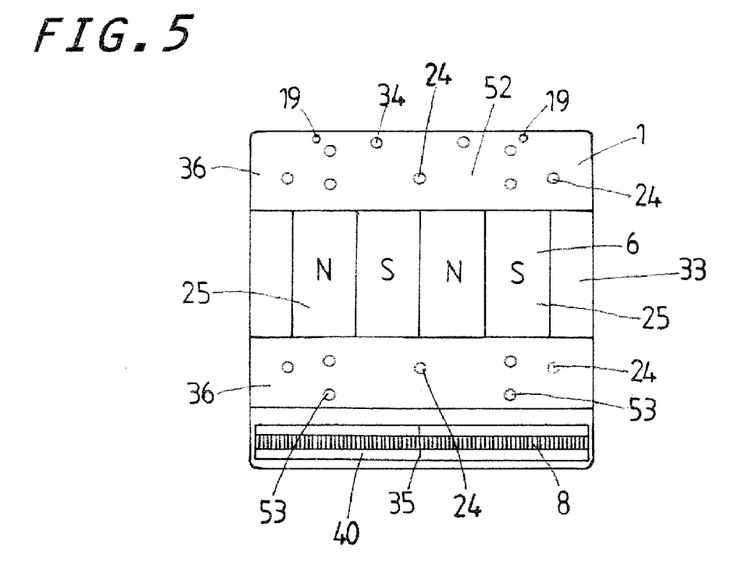
FIG. 5 is a view in rear elevation of the moving table, which is disassembled apart from the sliding device of FIG. 2 and turned over to look into the interior thereof.

With the sliding device 50 having the armature assembly 5 lying on an upper surface 51 of the bed 2 as seen in FIG. 4, there is no equipment including limit sensors, before-origin sensors, and so on, which have been installed on the existing sliding devices so far. Thus, the bed 2 of the present invention is constructed to have only the armature windings 7 and their associated wiring circuits. On other side, the table 1 as shown in FIG. 5 is mounted on the lower surface 52 thereof with only the field magnet 6 and a linear scale 8. The table 1 has no equipment other than the field magnet 6 and the linear scale 8, such as end plates placed with accompanying the field magnet, auxiliary magnets, sensor magnets, and so on which have been usually mounted on the sliding device so far. Besides, the table 1 has no fixture supporting the origin mark thereon. Thus, the moving table 1 of the present invention is constructed to have only both the field magnet 6 and linear scale 8.

The table 1 has a mounting surface 40 against which the linear scale 8 is supported extending along the sliding direction. With the sliding device 50 of the present invention, the linear scale 8 is notched at fore and aft midway location referring to the origin mark 35. Thus, a linear encoder is made up of the linear scale 8 attached on the lower surface 52 of the table 1 in a way extending along any one side of the table, and a sensor 15 secured on the corresponding side of the bed 2 in opposition to the linear scale 8. The bed 2 sinks partially below the upper surface 51 thereof at forward and aft midway location on any one of widthwise opposing sides to form a recess 45 in which there are made threaded holes 44 that are used to fasten a supporting bracket 21 to the bed 2. The supporting bracket 21 has matching holes. The sensor 15 is mounted on the supporting bracket 21 that fits snugly into the recess 45. The supporting bracket 21 is fastened to the bed 2 with using fastening screws 32, which stretch through the matching holes in the supporting bracket 21 to fit into the threaded holes 44 in the bed 2.

The sliding device 50 has the onboard moving-magnet linear motor comprised of the armature assembly 5 of the armature windings 7 lying on the lengthwise flat bed 2, and the field magnet 6 mounted on the flat table 1 that is allowed to move back and forth in the lengthwise direction of the bed 2 by virtue of linear motion guide units 10. The field magnet 6 is composed of a plurality of permanent magnet segments 25 lying on the lower surface 52 of the table 1 confronting the bed 2 in a way unlike magnetic poles are juxtaposed alternately in polarity in a traveling direction of the table 1. The armature assembly 5 has many coreless armature windings 7 of flat configuration, which are installed on the upper surface 51 of the bed 2 confronting the table 1 in opposition to the field magnet 6 in lengthwise direction. With the sliding device 50 of the present invention, the armature windings 7 are laid on a board 11 are covered with a protective sheet 20. The board 11 has none of holes to fasten the armature windings 7 and slots to locate in place the armature windings 7 as in the conventional one. Instead, the armature windings 7 are made integral with the board 11 in a molding 9 to be positioned firmly at proper locations thereof.

Figure 1:
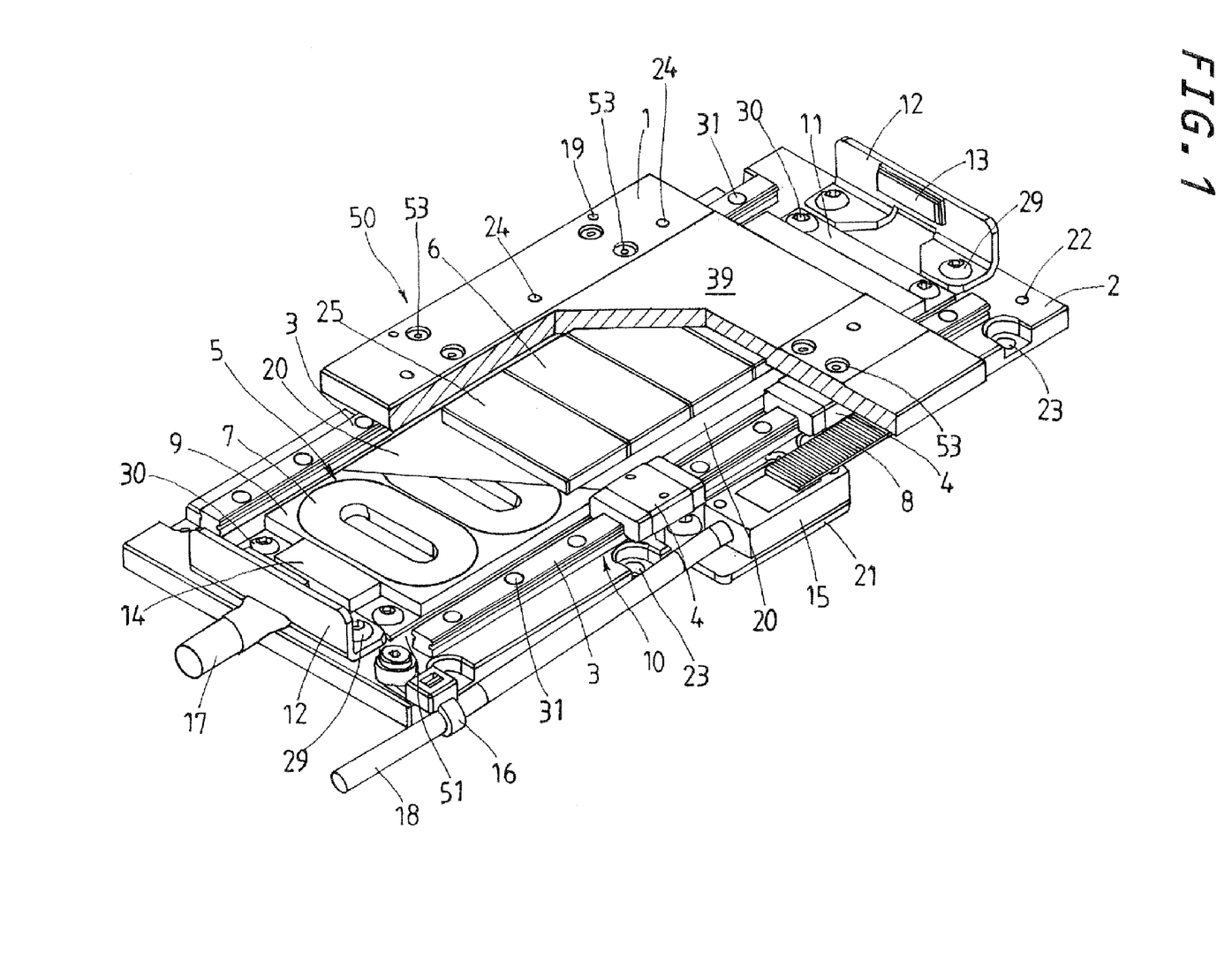
FIG. 1 is a partially broken away view in perspective showing a preferred embodiment of a sliding device with onboard moving-magnet linear motor in accordance with the present invention.
Figure 6:
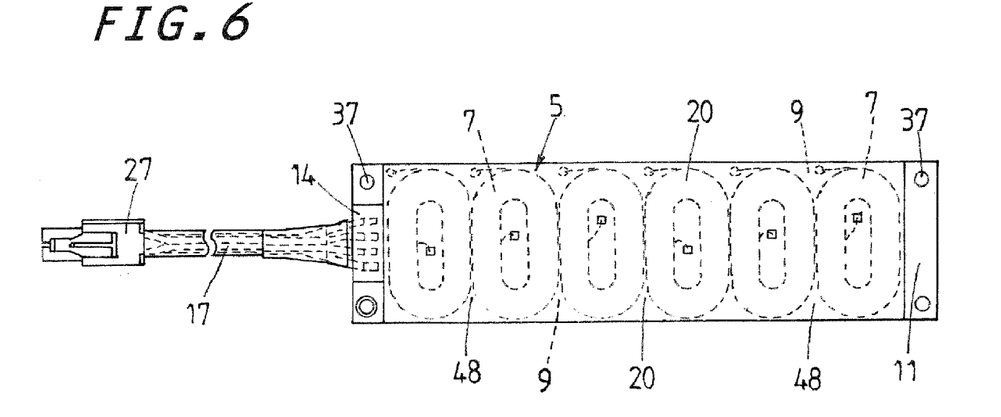
FIG. 6 is a top plan view showing an armature assembly for the sliding device of FIG. 2.
Figure 7:
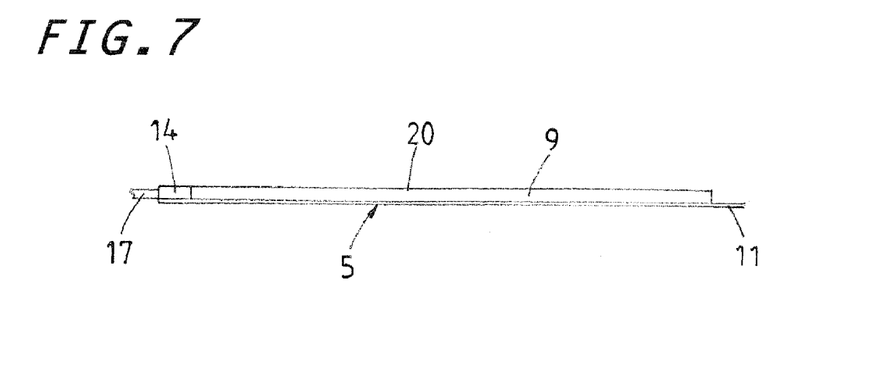
FIG. 7 is a view in front elevation of the armature assembly of FIG. 6.

The armature assembly 5 in the sliding device 50 of the present invention, as shown in FIGS. 1, 6 and 7, features the combined construction of the armature windings 7 secured on the board 11, the protective sheet 20 applied to coat the exposed surfaces of the armature windings 7 opposite of the board 11, and the molding 9 of adhesive material or bonding agent cast around the armature windings 7 to fill in the blanks remaining between the board 11 and armature windings 7, joining together them with each other. The protective sheet 20 of thin film in the armature assembly 5 is disposed to firsthand face the field magnet 6. The board 11 of the armature assembly 5 has a bottom that is especially made to fit snugly over the upper surface 51 of the bed 2. Moreover, the protective sheet 20 is made with a plurality of tiny holes 48 to aerate the interior atmosphere to the exterior of the protective sheet 20 to deal with the discrepancy in thermal expansion. The protective sheet 20 is to keep the armature windings 7 away from any foreign matter that would damage the armature windings 7 or cause any leakage accident. The protective sheet 20, moreover, has properties resistant to moisture or waterdrop, helping protect the armature windings 7 better. With the armature assembly 5 in the sliding device 50 of the present invention, the armature windings 7 is enclosed with the protective sheet 20 across their substantially overall surfaces that are opposite of the field magnet 6, while the protective sheet 20 is bonded to the board 11 to seal up the clearance or gap between them with the molding 9 or the first molding.

With the sliding device 50 constructed as stated earlier, the bed 2 on which the armature windings 5 are laid is made of magnetic material to function as the coil yoke to establish the magnetic circuit in part, while the table 1 on which the permanent magnet segments 25 are installed is also made of magnetic material to function as the magnet yoke to establish the magnetic circuit in part. Moreover, the armature assembly 5 is composed of the armature windings 7, the board 11 on which the armature windings 7 are installed in a juxtaposed relation with one another, and electric wirings placed on the board 11 to connect with a power line 17 for conveying electric power from any electric power source to the armature windings 7. The armature windings 7 lying on the board 11 are secured firmly to the board 11 with using the molding 9 of adhesive material cast around the armature windings 7. The board 11 is secured to the bed 2 in a way the underneath of the board 11 comes into mating with the upper surface 51 of the bed 2. The bed 2 is made with threaded holes 43 and, correspondingly, the board 11 has matching holes 37. Thus, the board 11 is fastened to the bed 2 with fastening screws 30 that extend the matching holes 37 to fit into their associated threaded holes 43.

With the sliding device 50 of the present invention, wiring connections to connect the electric wirings with the power line 17 on the board 11 are sealed in another molding 14 or the second molding of adhesive material as in the molding for the armature windings 7. With sliding device 50, moreover, the board 11 has holes 37 on the forward and aft ends at sidewise spaced areas where there is no molding 9, 14. With sliding device 50 in which the armature assembly 5 is constructed as stated earlier, the field magnet 6 and the armature windings 7 are placed opposite in close proximity to one another with the thin protective sheet 20 lying between them to leave a slight clearance between them. This closer formation of the armature windings 7 with the field magnet 6 contributes to more powerful electromagnetic interaction of the a current flowing in the armature windings 7 with magnetic flux created by the field magnet 6, thereby enhancing the propulsion exerted on the table 1. The molding 9 cast around the armature windings 7 functions to make sure of high dust-proofing, durable and safety properties, ease in use and handling. Four in all of matching holes 37 are made in the corners of the board 11, two in each of forward and aft ends of the board 11. The formation of the matching holes 37 is envisaged making the use or handling if the board 11 easier. The matching holes 37 are used to fasten the board 11 to the bed 2 with the fastening screws.

Figure 2:
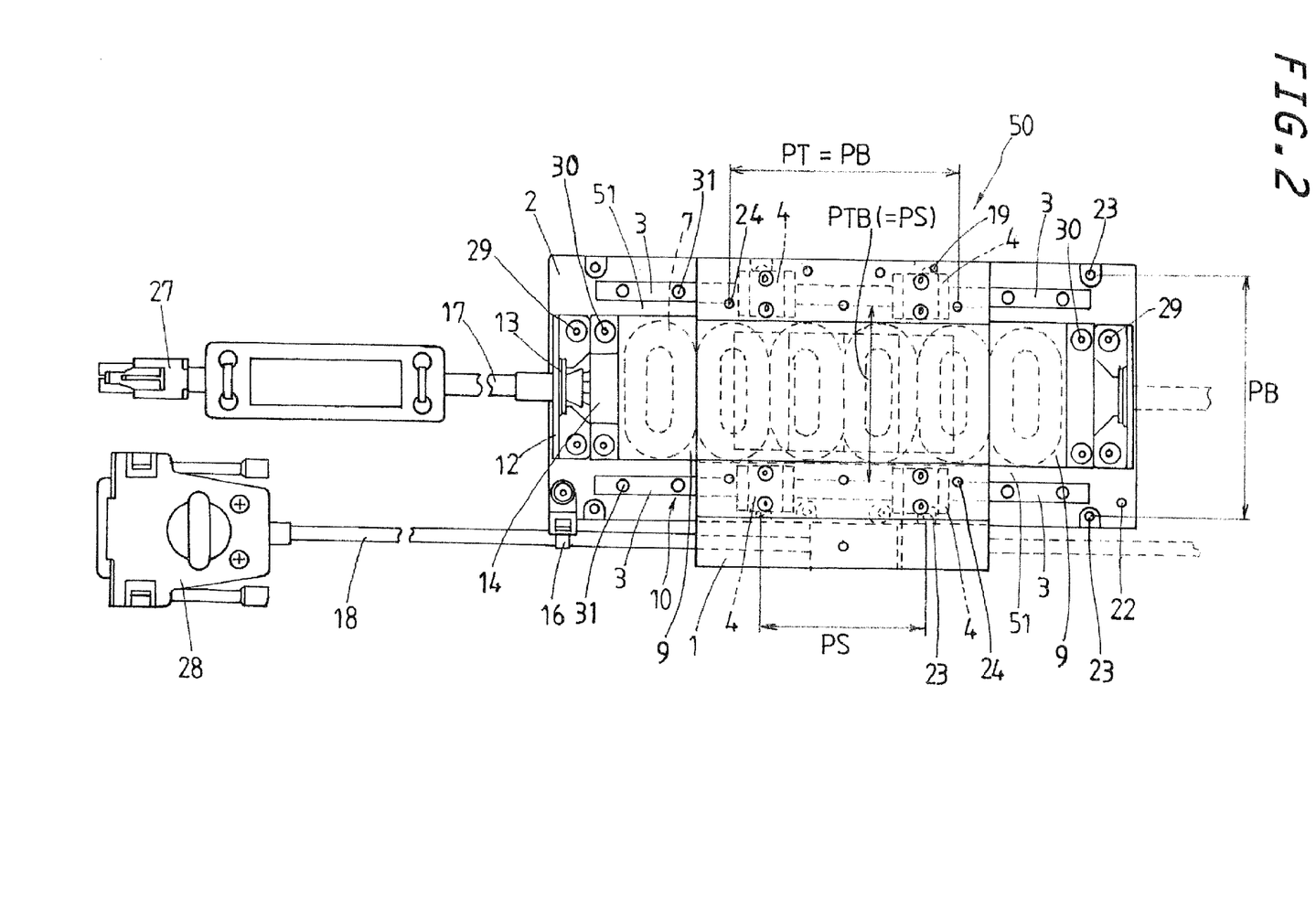
FIG. 2 is a top plan view of the sliding device of FIG. 1.
Figure 3:
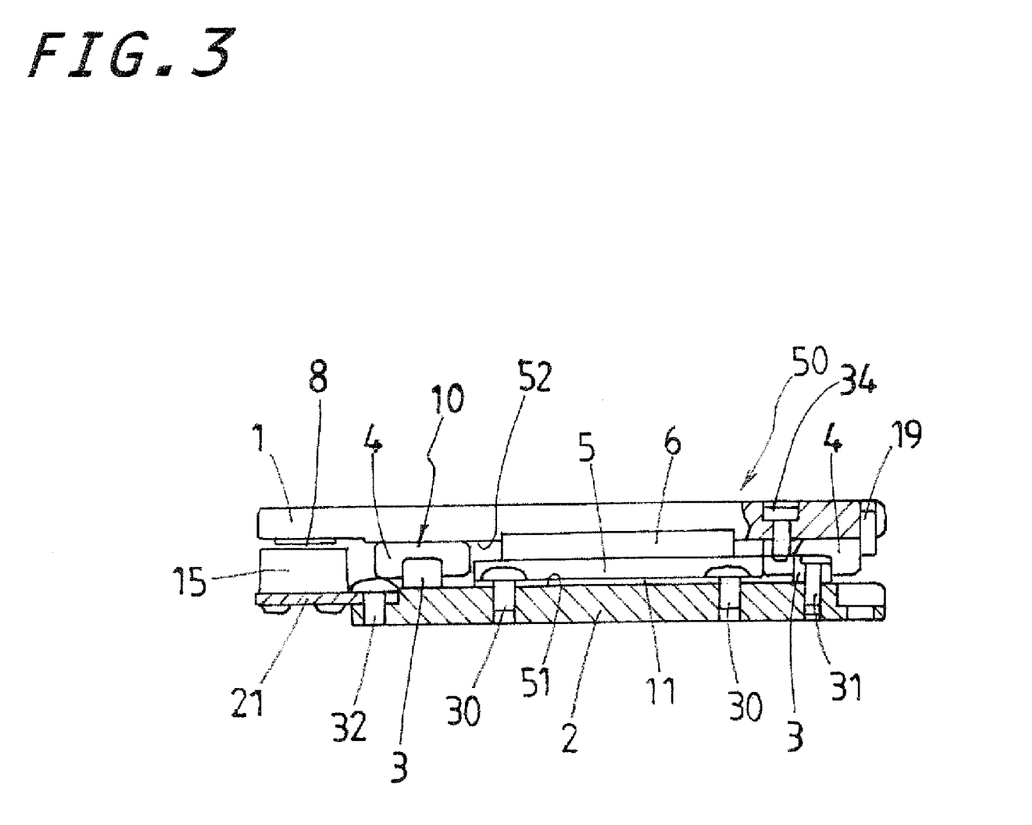
FIG. 3 is a side elevation, partially in section, of the sliding device of FIG. 2.

As shown in FIGS. 1, 2, 4, and from 12 to 13, the sliding device 50 of the present invention has end plates 12 installed on forward and aft ends of the bed 2, one to each end, to keep the table 1 against falling away from the bed 2. The end plates 12 are each simple in construction, which is made of steel plate just bent into L-shape. The end plates 12 have buffers 13 on their inward surfaces facing their associated ends of the bed 2. Each end plate 12 of L-shape as shown in FIG. 1 and from 12 to 14 has a recess 47 at widthwise middle thereof to accommodate the power line 17 therein. The end plates 12 are fastened to the forward and aft ends of the bed 2 in a fashion coming into abutment against their associated ends of the board 11 of the armature assembly 5 to keep in place the armature assembly 5 in the lengthwise direction. The end plates 12 are made therein with matching holes 46 while the bed 2 has threaded holes 42. Thus, the end plates 12 are secured to the bed 2 with fastening bolts 29 that extend through the matching holes 46 to fit into the treaded holes 42.

With the sliding device 50 of the present invention, the linear motion guide units 10 as apparent from FIG. 2 are preferred to keep the field magnet 6 accurately parallel with respect to the armature assembly 5 and also maintain the linear scale 8 in accurate parallel with the sensor 15. The linear motion guide units 10 are made up of a pair of guide rails 3 lying on the bed 2 and four of sliders 4 secured on mounting areas 36 defined on the lower surface 52 of the table 1. The bed 2 is made with threaded holes 41 while the guide rails 3 have matching holes. Thus, the guide rails 3 are fastened to the bed 2 with set screws 31 extending through the matching holes in the guide rails 3 to fit into the treaded holes 41 in the bed 2. The linear motion guide units 10 are constructed in a fashion that a pair of the sliders 4 is assigned to one of the paired guide rails 3. There are provided locating pins 19, one to each slider 4, to make certain of accurate location of every slider 4 even with simple construction.

Figure 18:
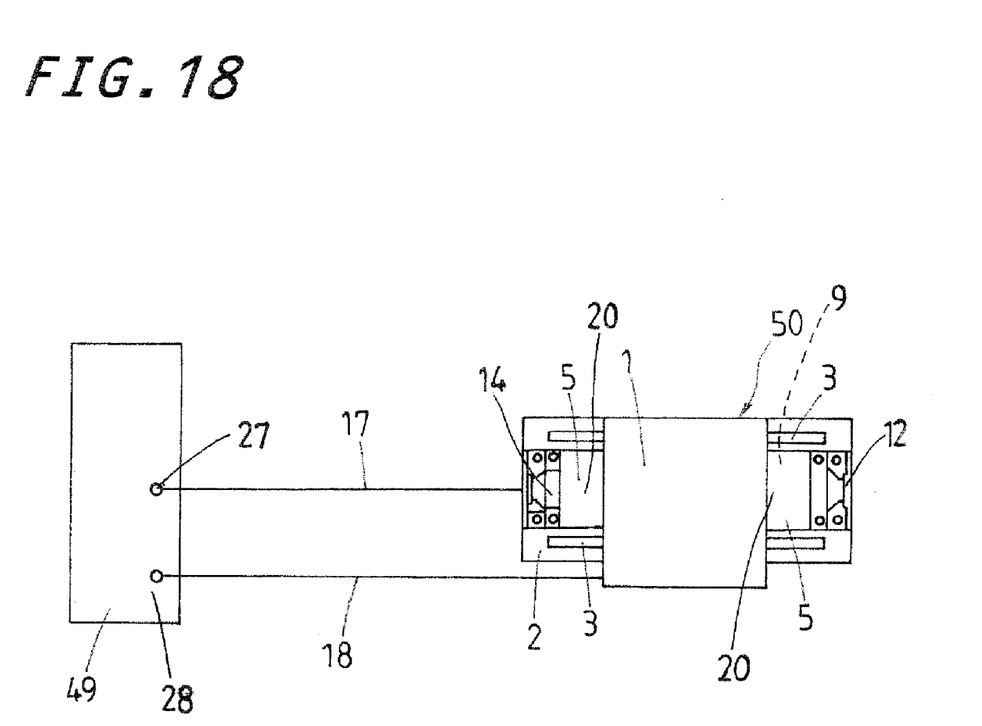
FIG. 18 is a schematic view explanatory of working relation of the sliding device of FIG. 1 with a control console to actuate the sliding device.

The control console 49 to carry out position control of the table 1 relatively to the bed 2 as shown in FIG. 18 is off the sliding device 50 and connected with a terminal 27 of the power line 17 and another terminal 28 of the sensor line 18. Selection of the control console 49 apart from the sliding device 50 makes easier the inexpensive production of the sliding device inclusive of the control console 49 and further improvement in high velocity and high response of operation. The sensor line 18 is supported on the bed 2 by a retainer band 16 fastened to the bed 2 with a threaded screw that fits into a threaded hole 22 made in the bed 2.

The sliding device 50 constructed as stated earlier is made in the simple construction in which only the field magnet 6 and the armature windings 7 are incorporated. The sliding device 50 can be easily customized by only changing the field magnet 6 and the armature windings 7 in their number. Thus, the sliding device 50 of the present invention is successfully available in replacement for any conventional one of three types including, for example, a long type the table is allowed to travel across the stroke range of 120 mm, a medium type of the stroke range over 65 mm and a small type having the stroke range over 25 mm. The sliding device 50 recited earlier is shown as being available for the medium type the table 1 is allowed to move across the stroke range of 65 mm. Any of the sliding devices 50 of three types different in strake range, compared with the conventional equivalents, is made less or compact in lengthwise dimension. The linear motion guide units 10 built in the sliding device 50 are desired to be maintenance-free for lubrication, for example, the linear motion guide unit of the sort disclosed in the commonly assigned Japanese Patent Laid-Open No. 2001-82469 is recommended.

With the sliding device 50 of the present invention as apparent from FIGS. 8 to 11, moreover, the table 1 and the bed 2 are both made in simply flat shape with no raised or recessed surface to save cutting or shaping procedure. The flat configuration of the bed 2, especially, gives an advantage to making the associated components inexpensive. The armature windings 7, as with the conventional ones, are grouped into any number of sets of three windings 7, each of which carries any one phase current of three-phase conduction system. On the other side, the table 1 is made with some spare threaded holes 34 that are used to fasten any desired components complying with the customer's needs. The linear scale 8 is of optical scale. Moreover, the adhesive materials for the molding are, for example, epoxy resins of thermosetting property. Among the thermosetting resins, any plastic resin is preferable, in which a major ingredient is mixed with a hardener to undergo chemical reaction that results in solidification. The protective sheet 20 is made of any glass-reinforced plastics.

Figure 8:
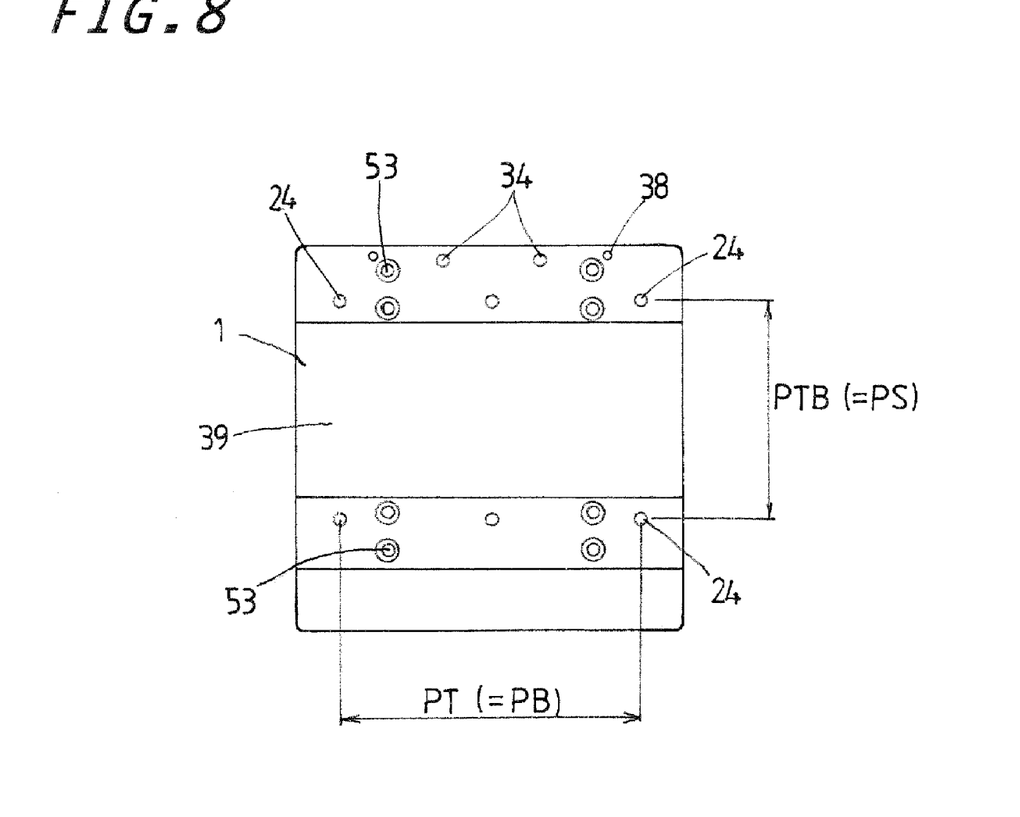
FIG. 8 is a top plan view the moving table to be installed in the sliding device of FIG. 2.
Figure 9:
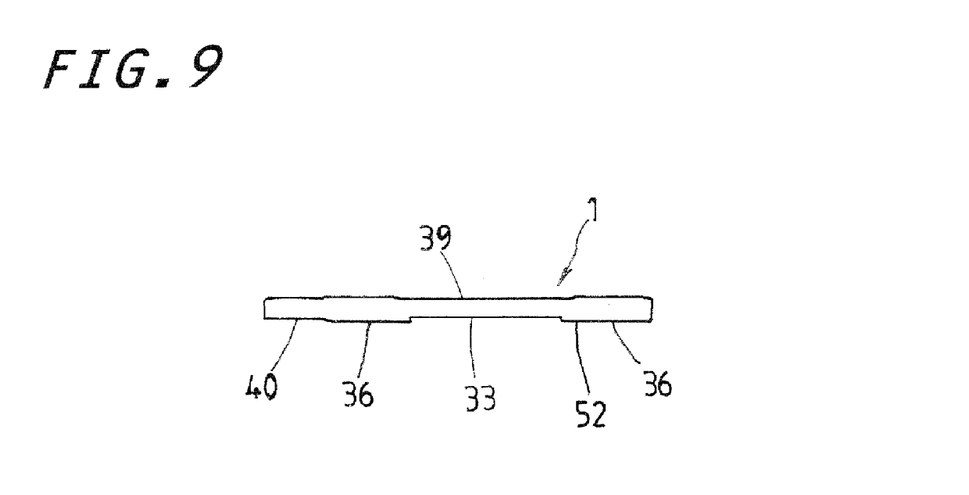
FIG. 9 is a view in side elevation of the moving table of FIG. 8.
Figure 10:
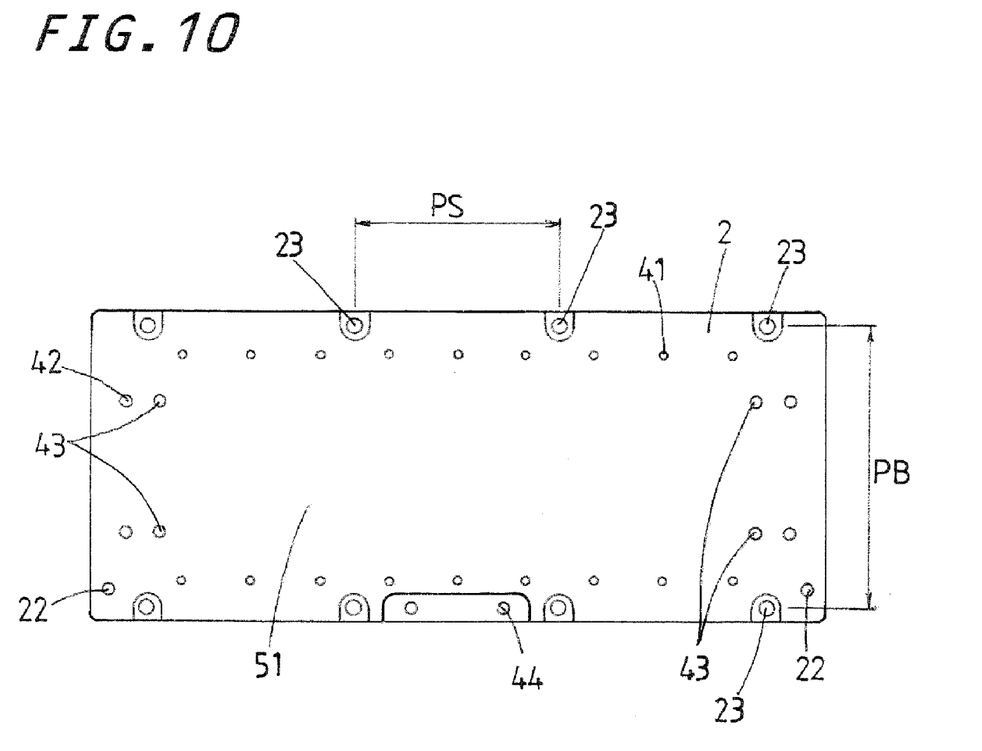
FIG. 10 is a top plan view showing a bed to be installed in the sliding device of FIG. 2.
Figure 11:
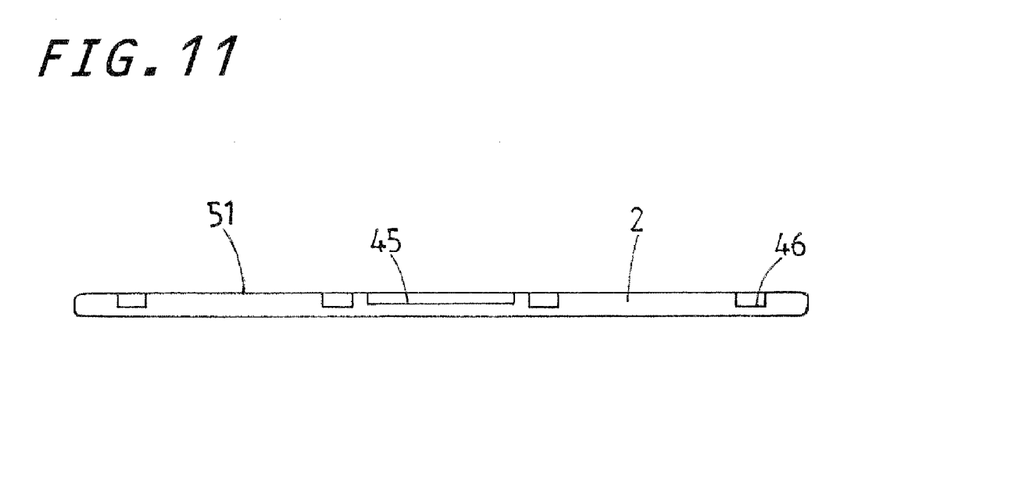
FIG. 11 is a view in front elevation of the bed of FIG. 10.
Figure 12:
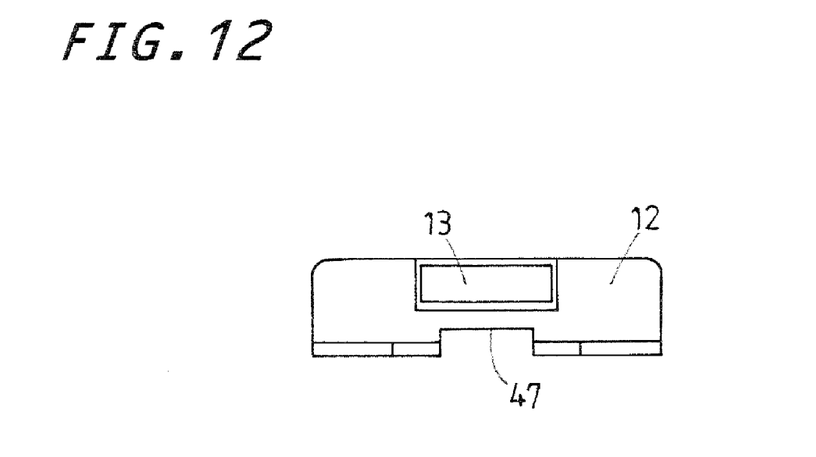
FIG. 12 is a view in rear elevation of an end plate to be installed in the sliding device of FIG. 2.
Figure 13:
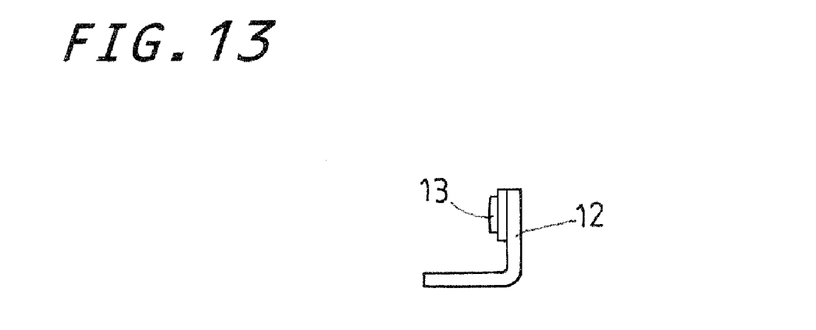
FIG. 13 is a view in side elevation of the end plate of FIG. 12.
Figure 14:
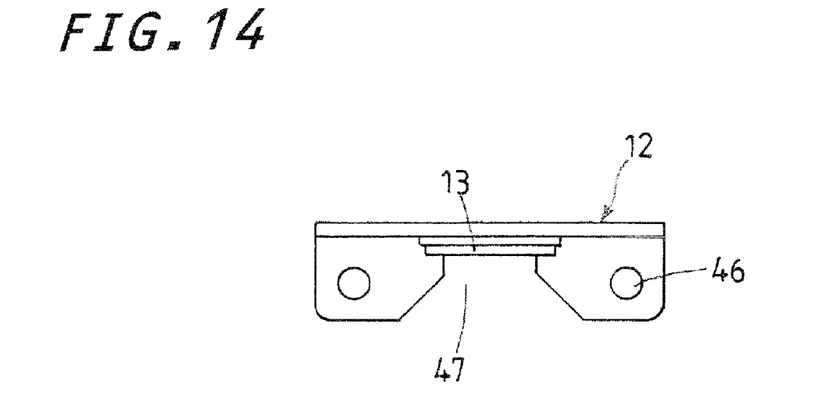
FIG. 14 is a top plan view showing the end plate of FIG. 12.
Figure 15:
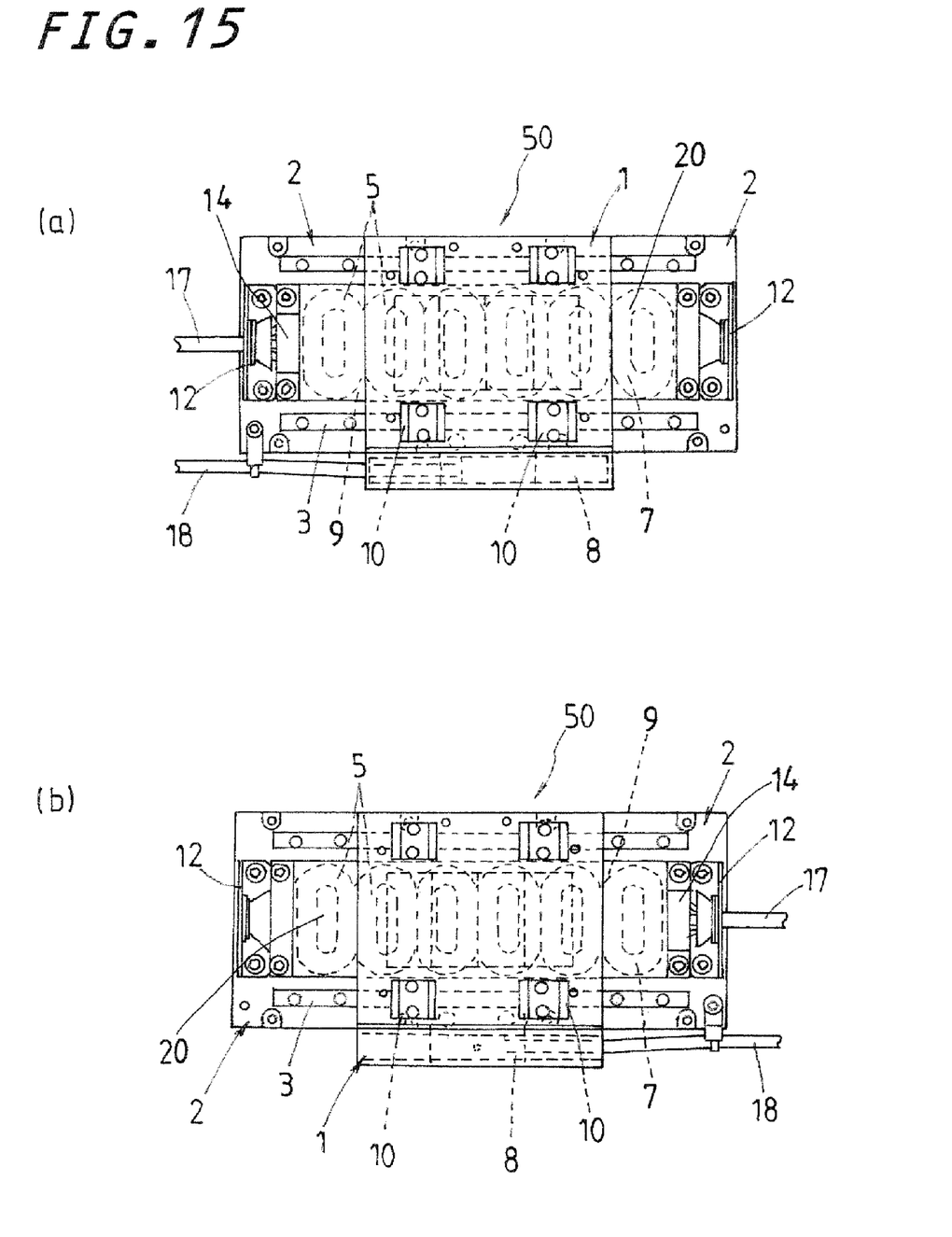

The sliding device 50 of the present invention, as apparent from FIGS. 2, 4, 5, 8 and 10, is made symmetrical in the lengthwise direction or sliding direction. With the symmetric construction of the sliding device 50 as stated just above, the power line 17 and the sensor line 18 as shown in FIG. 15 can be selectively installed in a fashion extending either from right to left with respect to the table 1 or vice versa in conforming to design considerations due to lack of space or inaccessibility for operation. Thus, the sliding device 50 is said made ease to use or handling. Both the table 1 and bed 2 as seen in FIGS. 8 and 10 are symmetrical in the sliding direction of the table 1. Besides, the table 1 has threaded holes 24 that are used to fasten any work, other component, and so on thereto while the bed 2 is made with holes 23 that are used to secure the bed 2 to any counterpart including a machine bed, base, and the like.

Figure 16:
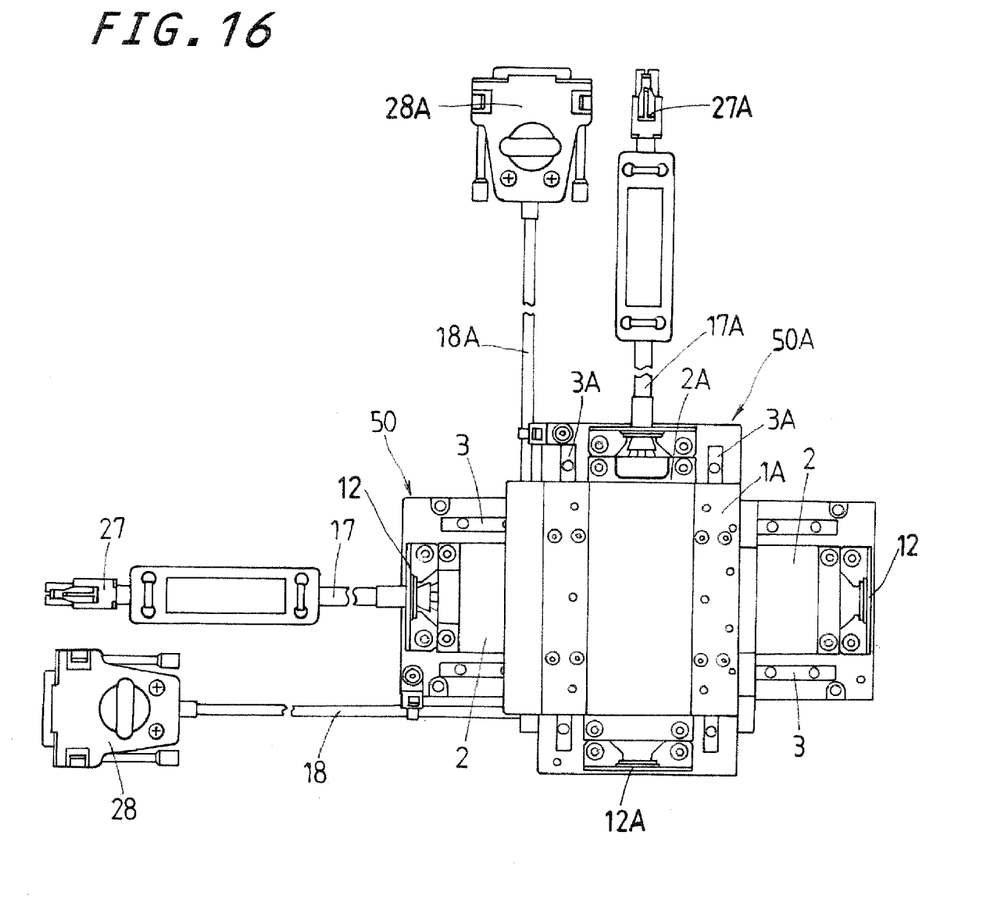
FIG. 16 is a view in top plan showing a dual-sliding device in which the sliding devices of FIG. 1 are paired with each other in a fashion that any one of the paired sliding devices lies, for example in an X-axis direction while the other is in a Y-axis direction perpendicular to the X-axis direction.
Figure 17:
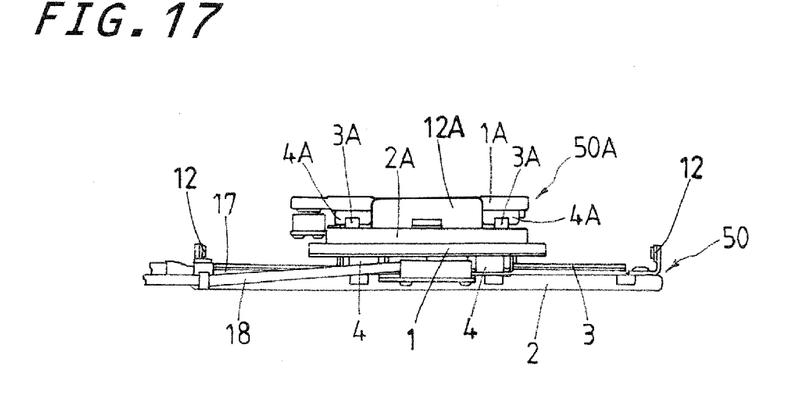
FIG. 17 is a view in front elevation of the dual-sliding device of FIG. 16.

Referring to FIGS. 16 and 17, there is shown arrangement of two staggered sliding devices 50 and 50A in perpendicular relation with one another. Most components of the second sliding device 50A are the same as previously described for the sliding device 50. To that extent, the components have been given the same reference characters with suffix "A", so that the previous description will be applicable. According to the embodiment illustrated, a pitch or interval between the threaded holes 24, as shown in FIG. 2, 8, 10, especially 16 and 17, are determined to match to the hole positions of the holes 24 in the bed 2 after a 90° rotation to install the two sliding devices 50 and 50A one upon the other to make it possible to combine the two sliding devices 50 and 50A in the perpendicularly staggered relation with one another. To this end, an interval (PB) between the holes 23 made in the bed 2 in sidewise spaced away from one another is identical with a distance (PT) between any two threaded holes 24 spaced lengthwise in the table 1, while a pitch (PS) between successive holes 24 in lengthwise direction in the bed 2 is equivalent to an interval (PTB) between the threaded holes 24 spaced sidewise in the table 1. Thus, the sliding devices 50 and 50A are combined with one another by only direct connection between them with no need of any specialty interface to provide, for example, an X-Y positioning system to make biaxial position control in X-direction and Y-direction perpendicular to one another.

What is claimed is:

1. A sliding device with onboard moving-magnet linear motor, comprising:
   an elongated bed of flat configuration,
   a table of flat configuration movable for reciprocation in a lengthwise direction by virtue of a linear motion guide unit,
   a field magnet of magnet segments lying on a first surface of the table opposite the bed in a way unlike magnetic poles are juxtaposed alternately in polarity in a traveling direction of the table, and
   an armature assembly having coreless armature windings of flat shape, which are installed on a second surface of the bed opposite the table in opposition to the field magnet in lengthwise direction,
   wherein the bed and the table are both made of magnetic material to provide magnet yoke and coil yoke for establishing magnetic circuits in part,
   wherein the armature assembly is composed of the armature windings, a board on which the armature windings lie in juxtaposition, a wiring lying on the board and making connections with a power line to supply electric power to the armature windings, and an adhesive material cast around the armature windings to get the armature windings closely adhering to the board whose a lower surface is fastened immediately to the second surface of the bed,
   wherein end plates are fastened to forward and aft ends of the bed in a way coming into contact with ends of the board of the armature assembly to keep the table against falling away from the bed, and
   wherein the end plates are each made of a plate member bent into an L-shape in section and made with a recess to fit over the power line.

2. A sliding device constructed as recited in claim 1, wherein the armature assembly includes a protective sheet covering an overall surface of the armature windings opposite the field magnet, and a first molding of adhesive material cast to secure the armature windings lying between the protective sheet and the board.

3. A sliding device constructed as recited in claim 1, wherein the armature assembly further includes a second molding of adhesive material cast to secure connections of the power line with the wiring on the board.

* * * * *